United States Patent [19]
Watanabe

[11] Patent Number: 5,535,425
[45] Date of Patent: Jul. 9, 1996

[54] CHANNEL SWITCHING CONTROL IN MOBILE TELECOMMUNICATION SYSTEM

[75] Inventor: Keizo Watanabe, Kawasaki, Japan

[73] Assignee: Fujitsu Limited, Kanagawa, Japan

[21] Appl. No.: 378,396

[22] Filed: Jan. 26, 1995

[30] Foreign Application Priority Data

Mar. 1, 1994 [JP] Japan .................................. 6-030745

[51] Int. Cl.$^6$ .............................. H04Q 7/00; H04Q 9/00
[52] U.S. Cl. ...................... 455/33.2; 455/34.1; 455/58.1; 379/60
[58] Field of Search .................... 455/33.1, 33.2, 455/34.1, 34.2, 54.1, 56.1, 58.1, 67.1, 58.2; 379/60

[56] References Cited

FOREIGN PATENT DOCUMENTS 63-245142 10/1988 Japan .
2-219329 8/1990 Japan .
4-144429 5/1992 Japan .

OTHER PUBLICATIONS

Jun, A Novel Priority Queue Scheme or Handoff Procedure, IEEE, pp. 182–186 May 1994.
Tekinay et al., Analysis of Measurement Based Prioritization Schemes for Handovers in Cellular Networks Dec. 1992.
Tekinay et al., An Effective Prioritization Scheme for Handovers in Cellular Networks Oct. 1992.

*Primary Examiner*—Reinhard J. Eisenzopf
*Assistant Examiner*—Marsha D. Banks-Harold

[57] ABSTRACT

Channel switching control in a mobile telecommunication system of a multiple zone configuration provided with base stations of zones for engaging in radio communication with mobile stations and base station control equipment for controlling the base stations, wherein the base station control equipment performs priority processing on a request for channel switching due to deterioration of quality, in which there is little margin of time until the quality of service deteriorates below a predetermined level, when receiving a request for channel switching to a stronger field transferred from a mobile station through a base station and a request for channel switching due to deterioration of quality from a base station, thereby enabling channel switching able to ensure a predetermined quality of service.

11 Claims, 11 Drawing Sheets

| MOBILE STATION NUMBER (20A) | MOBILE STATION NUMBER (20B) |
|---|---|
| ⋮ | ⋮ |
| - | 205 |
| 211 | 110 |
| 101 | 121 |

Fig.7B

| MOBILE STATION NUMBER (49) | RECEIVED LEVEL [dBμ] |
|---|---|
| ⋮ | ⋮ |
| 110 | 20 |
| 101 | 4 |
| 121 | 10 |

Fig.7C

| MOBILE STATION NUMBER (59) | RECEIVED LEVEL [dBμ] |
|---|---|
| ⋮ | ⋮ |
| 110 | 20 |
| 121 | 10 |
| 101 | 4 |

Fig.7D

| MOBILE STATION NUMBER | DETERIORATION RATE [dB] |
|---|---|
| ⋮ | ⋮ |
| 101 | 7 |
| 121 | 3 |

Fig.7E

| MOBILE STATION NUMBER | DETERIORATION RATE [dB] | RECEIVED LEVEL [dBμ] |
|---|---|---|
| ⋮ | ⋮ | ⋮ |
| 211 | 7 | 20 |
| 101 | 7 | 4 |
| 121 | 3 | 10 |

CHANNEL SWITCHING CONTROL IN MOBILE TELECOMMUNICATION SYSTEM

BACKGROUND OF THE INVENTION

1. Field of the Invention

The present invention relates to a channel switching control in a mobile telecommunication system of a multiple zone configuration.

In a mobile telecommunication system of a multiple zone configuration, some of the service areas which can communicate with a base station will have heavy or light loads. Further, the degree of deterioration of the received level of a mobile station will differ according to the speed of movement of the mobile phone, car phone, or other mobile station or the topography of the location where it is present. Accordingly, there will be mobile stations with a sufficient margin of time from when they send channel switching requests to when they can no longer maintain the desired quality and mobile stations which have no such margin of time. Accordingly, it is desired to enable channel switching without allowing the quality of service to fall.

2. Description of the Related Art

As will be explained in detail later with reference to the drawings, in a mobile telecommunication system of a multiple zone configuration, the channels have to be switched when a mobile station moves across zones. In this case, since there are a limited number of speech channels in any one zone, when for example there is just one idle channel and there is a request for channel switching from a mobile station with a margin of time until the quality of service becomes worse than a predetermined level and a request for channel switching from a mobile station with no margin of time until the quality of service becomes worse than the predetermined level, the conventional type of base station control equipment would assign the idle channel to the mobile station which first made the channel switching request. Accordingly, the mobile station which requested the channel switching just after that would find its channel switching request rejected due to the lack of an idle channel.

When this situation occurred, the mobile station with no margin of time until the quality of service deteriorated beyond the predetermined level would not be able to switch channels and therefore there was the problem that the predetermined quality of service could not be maintained a short time later and service would remarkably deteriorate.

SUMMARY OF THE INVENTION

Therefore, the present invention has as its object to control channel switching in accordance with the various types of conditions determining if a quality of service can be maintained.

To attain the above object, there is provided a system for channel switching control in a mobile telecommunication system provided with base stations of zones for engaging in radio communication with mobile stations and base station control equipment for controlling the base stations, wherein the base station control equipment performs priority processing on a request for channel switching due to deterioration of quality, in which there is little margin of time until the quality of service deteriorates below a predetermined level, when receiving a request for channel switching to a stronger field transferred from a mobile station through a base station and a request for channel switching due to deterioration of quality from a base station.

BRIEF DESCRIPTION OF THE DRAWINGS

The above objects and features of the present invention will be more apparent from the following description of the preferred embodiments with reference to the accompanying drawings, wherein.

DESCRIPTION OF THE PREFERRED EMBODIMENTS

Before describing the embodiments of the present invention, the related art and the disadvantages therein will be described with reference to the related figures.

Figure 8:
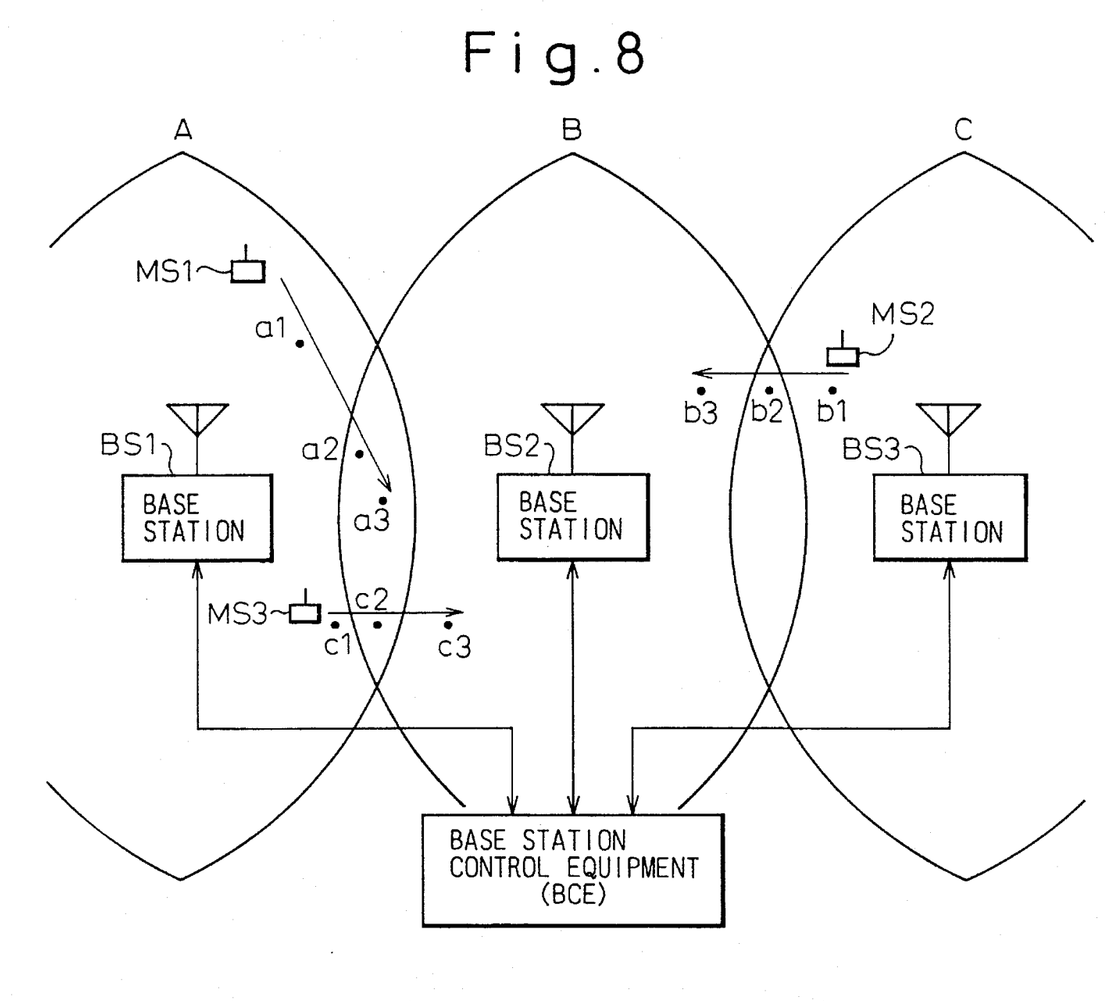
FIG. 8 is a view explaining a mobile telecommunication system.

FIG. 8 is a view explaining a mobile telecommunication system, wherein MS1, MS2, and MS3 are mobile stations, BS1, BS2, and BS3 are base stations, BCE is a base station control equipment, and A, B, and C are zones of the base stations BS1, BS2, and BS3. The base station control equipment BCE performs channel switching processing for the mobile stations MS1, MS2, and MS3 in accordance with requests for channel switching from the mobile stations MS1, MS2, and MS3 caused by a drop in the received level or requests for channel switching from the base stations BS1, BS2, and BS3 due to deterioration of the quality of service.

Figure 9:
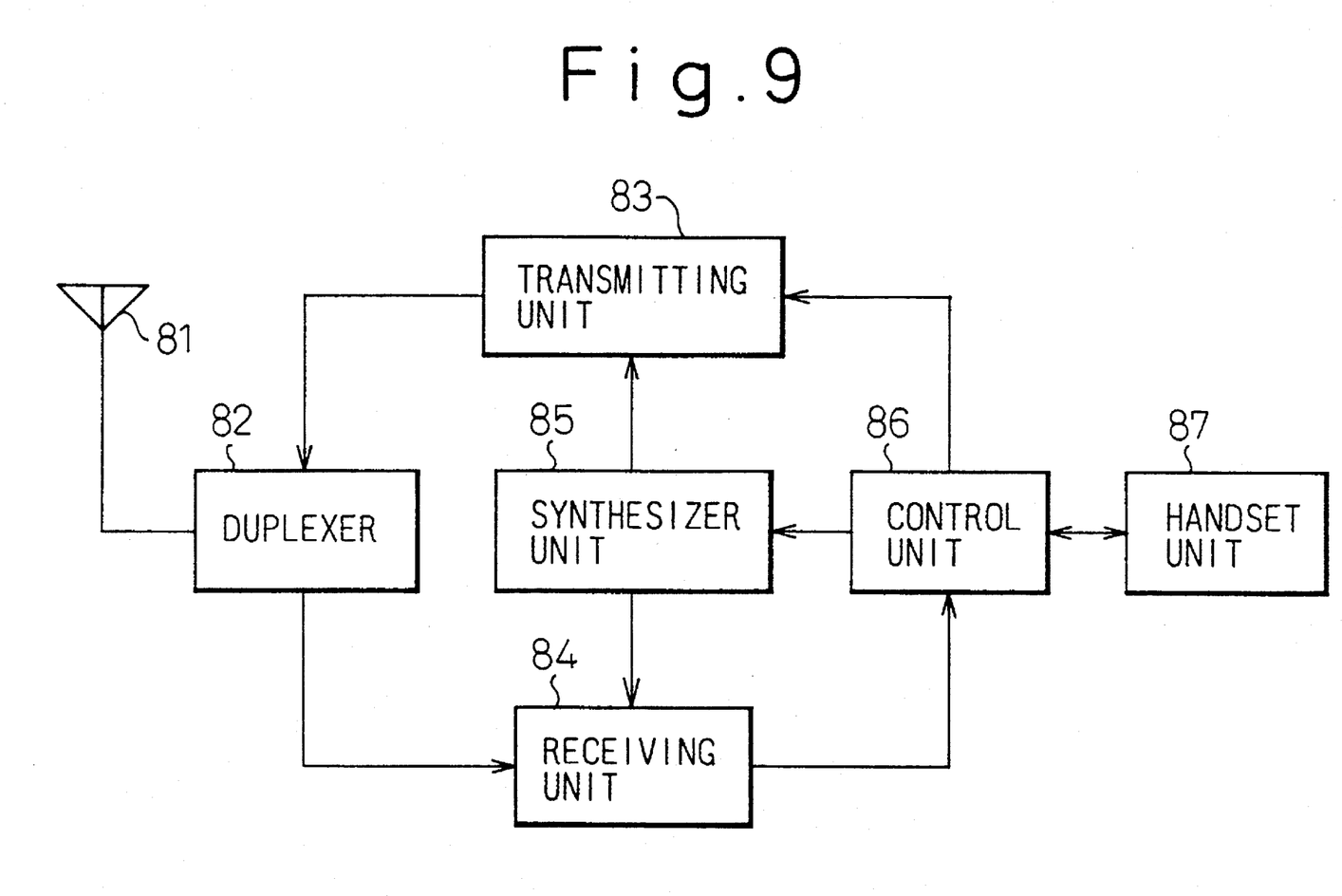
FIG. 9 is a view explaining a mobile station.

FIG. 9 is a view explaining a mobile station, in which 81 is an antenna, 82 a duplexer, 83 a transmitting unit, 84 a receiving unit, 85 a synthesizer unit, 86 a control unit, and 87 a handset unit. The handset unit 87 includes a speaker, receiver, dial buttons, etc. and is used for making and receiving calls. The speaker and receiver are used for talking with another subscriber.

The transmitting unit 83 includes a modulator and amplifier. The receiving unit 84 includes a demodulator, amplifier, received level measuring unit, etc. The control unit 86 controls the synthesizer unit 85 to set the channels for transmission and reception between the transmitting unit 83 and the receiving unit 84. The waves from the base station are received by the antenna 81 and the received signal is supplied to the receiving unit 84 through the duplexer 82. The results of the measurement of the received level are notified to the control unit 86. The control unit 86 determines if the received level is within a predetermined range in which a predetermined quality of service can be maintained. When it falls below a predetermined level and the received field of the neighboring zone is over the predetermined level, a request for channel switching to the stronger field is given to the transmitting unit 83, where it is modulated, amplified, and then sent from the antenna 81 to the base station.

Figure 10:
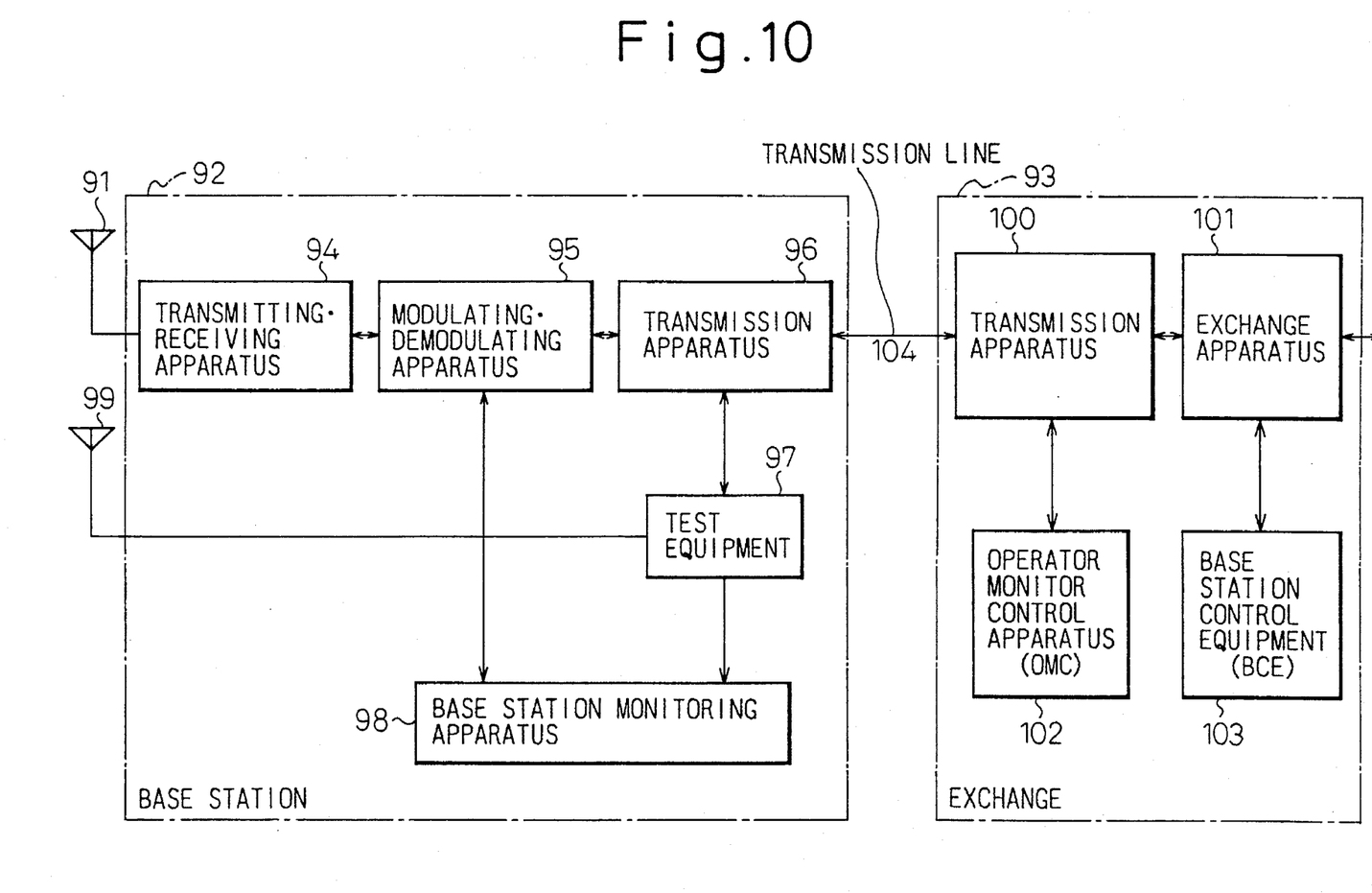
FIG. 10 is a view explaining a base station and an exchange.

FIG. 10 is a view explaining a base station and an exchange, in which 91 and 99 are antennas, 92 is a base station, 93 is an exchange, 94 is a transmitting/receiving apparatus, 95 is a modulating-demodulating apparatus, 96 and 100 are transmission apparatuses, 97 is test equipment, 98 is a base station monitoring apparatus, 101 is an exchange apparatus, 102 is an operator monitor control apparatus (OMC), 103 is base station control equipment (BCE), and 104 is a transmission line.

The base station 92 is comprised of the transmitting/receiving apparatus 94 for communication with mobile stations, a transmission apparatus 96 for transferring various types of signals with the exchange 93, the modulating-demodulating apparatus 95 for demodulating a received signal and modulating a transmitted signal, the test equipment 97 for in-service tests etc., the antenna 99 for transmitting and receiving test waves, and the base station monitoring apparatus 98 for monitoring the various parts of the base station 92.

The exchange 93 is provided with a transmission apparatus 100 for transmitting and receiving various types of signals with one or more base stations 92, an exchange apparatus 101 for exchange and connection between the mobile stations and subscribers accommodated in the general exchange network, an operator monitor control apparatus 102, and a base station control equipment 103 for controlling the base stations 92.

Either the transmitting/receiving apparatus 94 or the modulating-demodulating apparatus 95 of the base station 92 is provided with a function for measuring the received level and a function for determining if the received level is enough to maintain a predetermined quality of service. When the received level falls to an extent where the quality of service cannot be maintained, a request for channel switching due to deterioration of quality is sent to the base station control equipment 103. If the base station control equipment 103 receives such a request for channel switching due to deterioration of quality and a request for channel switching to a stronger field from the mobile stations, the base station control equipment 103 processes whichever of the request for channel switching due to deterioration of quality or the request for channel switching to a stronger field was received first.

As explained above, in a mobile telecommunication system of a multiple zone configuration, the channels have to be switched when a mobile station moved across zones. In this case, since there are a limited number of speech channels in any one zone, when for example there is just one idle channel and there is a request for channel switching from a mobile station with a margin of time until the quality of service becomes worse than a predetermined level and a request for channel switching from a mobile station with no margin of time until the quality of service becomes worse than the predetermined level, the conventional type of base station control equipment 103 would assign the idle channel to the mobile station which first made the channel switching request. Accordingly, the mobile station which requested the channel switching just after that would find its channel switching request rejected due to the lack of an idle channel.

When this situation occurred, the mobile station with no margin of time until the quality of service deteriorated beyond the predetermined level would not be able to switch channels and therefore there was the problem that the predetermined quality of service could not be maintained a short time later and service would remarkably deteriorate.

Therefore, the present invention controls channel switching in accordance with the various types of conditions determining if a quality of service can be maintained.

Figure 1:
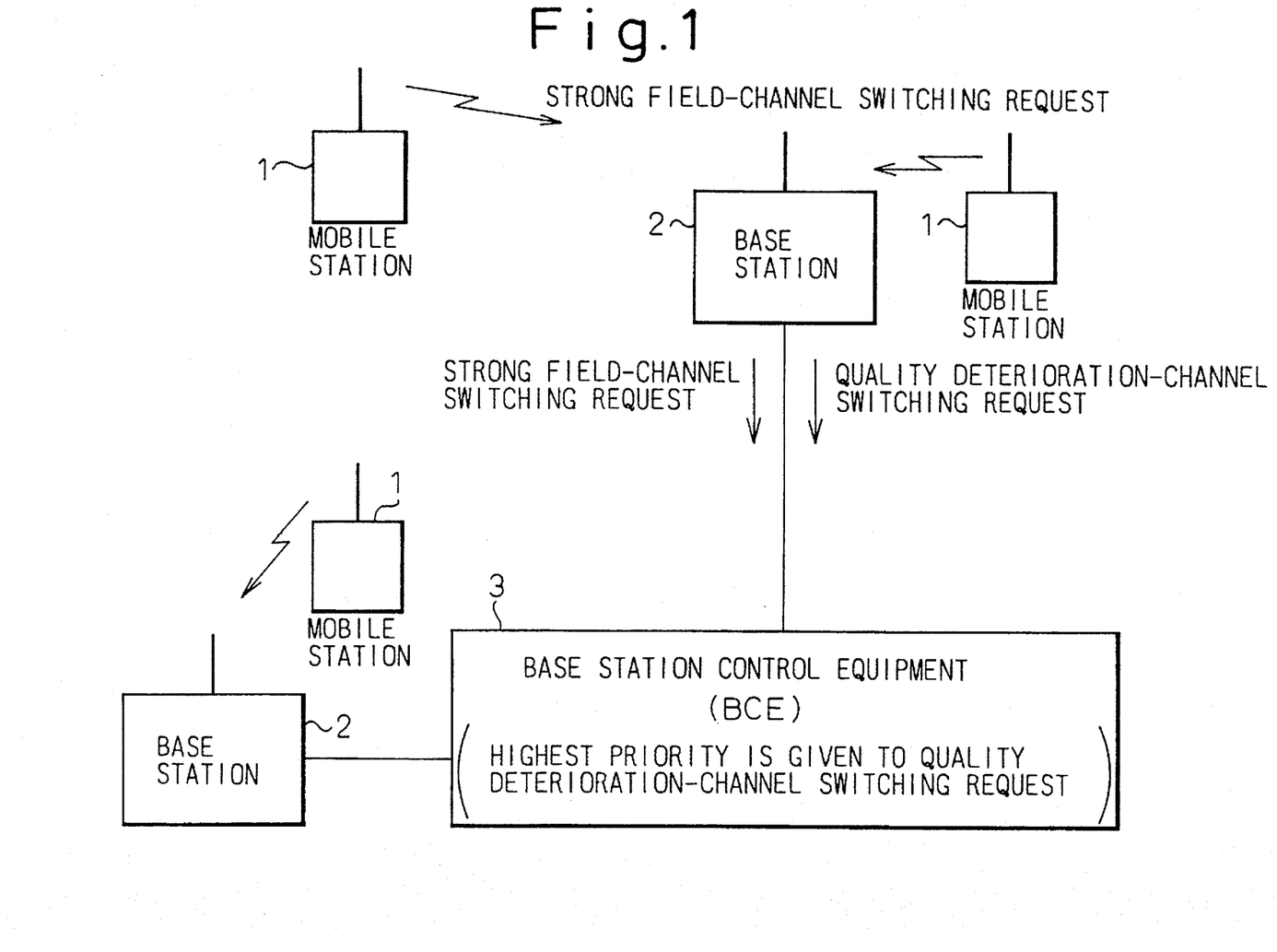
FIG. 1 is a view explaining the principle of the present invention.

The channel switching control of the present invention will be explained with reference to FIG. 1.

The present invention provides a channel switching control system for a mobile telecommunication system provided with base stations 2 of zones for engaging in radio communication with mobile stations 1 and base station control equipment 3 for controlling the base stations 2, wherein the base station control equipment 3 performs priority processing for a request channel switching due to deterioration of quality among a request for channel switching to a stronger field from a mobile station 1, caused when it is detected that there is another zone in which the received level would be higher than the received level of the zone of the base station 2 which the mobile station 1 is engaged in communication with, and a request for channel switching due to deterioration of quality from a base station 2, caused when the quality of service between the base station 2 and the mobile station 1 falls below a predetermined value.

When a mobile station 1 across zones and the received field of the neighboring zone is equal to or higher than the received field of the current zone in strength, it sends out a request for channel switching to the stronger field. When a base station 2 finds that the quality of service in radio communication with a mobile station 1 is deteriorating from a predetermined level due to a reduction in the received level etc., it sends out a request for channel switching due to deterioration of quality. In such cases, generally the mobile station relating to the request for channel switching due to deterioration of quality has less of a margin of time until the quality of service deteriorates from the predetermined level compared with the mobile station issuing the request for channel switching to a stronger field. Accordingly, the base station control equipment 3 discriminates if the request for channel switching is a request for channel switching to a stronger field or a request for channel switching due to deterioration of quality and executes channel switching processing on a priority basis for the mobile station relating to the request for channel switching due to deterioration of quality.

According to a first embodiment, the base station control equipment 3 is provided with a first queue unit for writing IDs of mobile stations relating to requests for channel switching due to deterioration of quality, a second queue unit for writing IDs of mobile stations issuing requests for channel switching to a stronger field, and a channel switching processing unit. The channel switching processing unit performs channel switching processing on the mobile stations having IDs written in the second queue unit when the first queue unit is empty.

The base station control equipment 3 discriminates if a request for channel switching is a request for channel switching to a stronger field or a request for channel switching due to deterioration of quality, writes the ID of the mobile station issuing the request for channel switching to a stronger field in the second queue unit, and writes the ID of the mobile station relating to the request for channel switching due to deterioration of quality in the first queue unit. It then executes channel switching processing on a priority basis on the mobile stations with IDs written in the first queue unit. When the first queue unit is empty, that is, when there is no mobile stations relating to requests for channel switching due to deterioration of quality, it executes channel switching processing on the mobile stations with IDs written in the second queue unit.

According to a second embodiment, the base station control equipment 3 is provided with a threshold value setting unit for setting a threshold value for deciding on priority execution, an idle channel monitoring unit, and a channel switching processing unit. The channel switching processing unit does not perform channel switching processing for mobile stations issuing requests for channel switching to a stronger field, but performs channel switching processing for mobile stations relating to requests for channel switching due to deterioration of quality when, according to the idle channel monitoring unit, the number of idle channels falls under the threshold value for deciding on priority execution set in the threshold value setting unit.

The idle channel monitoring unit counts the number of idle channels. The channel switching processing unit compares the number of idle channels and the threshold value for deciding on priority execution set in the threshold value setting unit. It executes channel switching processing on a priority basis for the mobile stations relating to the requests for channel switching due to deterioration of quality when the number of idle channels falls below this threshold value for deciding on priority execution. Therefore, channel switching processing is reliably performed with respect to mobile stations relating to requests for channel switching due to deterioration of quality, in which there is no margin of time until the quality of service deteriorates from a predetermined level.

According to a third embodiment, the base station control equipment 3 is provided with a queue unit and a channel switching processing unit. In the queue unit, there are written mobile-station numbers and received levels of the mobile stations relating to requests for channel switching. The channel switching processing unit selects the mobile station with the lowest received level in the queue unit and performs channel switching processing on that mobile station.

The queue unit writes the mobile-station numbers and received levels of the mobile stations relating to requests for channel switching in order. The channel switching processing unit searches through the queue unit and selects the mobile station having the lowest received level. That is, since the mobile station with the lowest received level is a mobile station with no margin of time until the quality of service deteriorates below a predetermined level, that mobile station is given priority to in the channel switching processing.

According to a fourth embodiment, the base station control equipment 3 is provided with a queue unit, an order rearranging unit, and a channel switching processing unit. The order rearranging unit compares the received levels of the mobile stations already written in the queue unit and the received level of a mobile station relating to a request for channel switching and rearranges the order in the queue unit in the order of the lowest received level down. The channel switching processing unit performs channel switching processing on the mobile station with the lowest received level at the top of the queue unit.

The order rearranging unit compares the received level of the mobile-station number newly written in the queue unit and the received levels of mobile-station numbers already written and rearranges the order of these in the queue unit from the lowest received level down. Accordingly, the channel switching processing unit executes the channel switching processing on the mobile station at the top of the queue unit and thereby can perform channel switching processing on a priority basis for the mobile station with the least margin of time.

According to a fifth embodiment, the base station control equipment 3 is provided with a deterioration rate recording unit for recording the rates of deterioration of the received levels and a channel switching processing unit. The deterioration rate recording unit records in it the rate of deterioration of the received level for each mobile station. The channel switching processing is performed on the mobile stations making requests for channel switching starting from the mobile station with the largest rate of deterioration.

When the speed of movement of a mobile station is fast, the rate of deterioration of the received level changes tremendously. Further, the rate of deterioration of the received level changes tremendously even with a low speed of movement of a mobile station in the case of a region where the intensity of the received field changes sharply. The rates of deterioration of the received levels are recorded and the priority is given in execution of channel switching processing to the mobile station with the largest rate of deterioration among the mobile stations relating to requests for channel switching.

Figure 2:
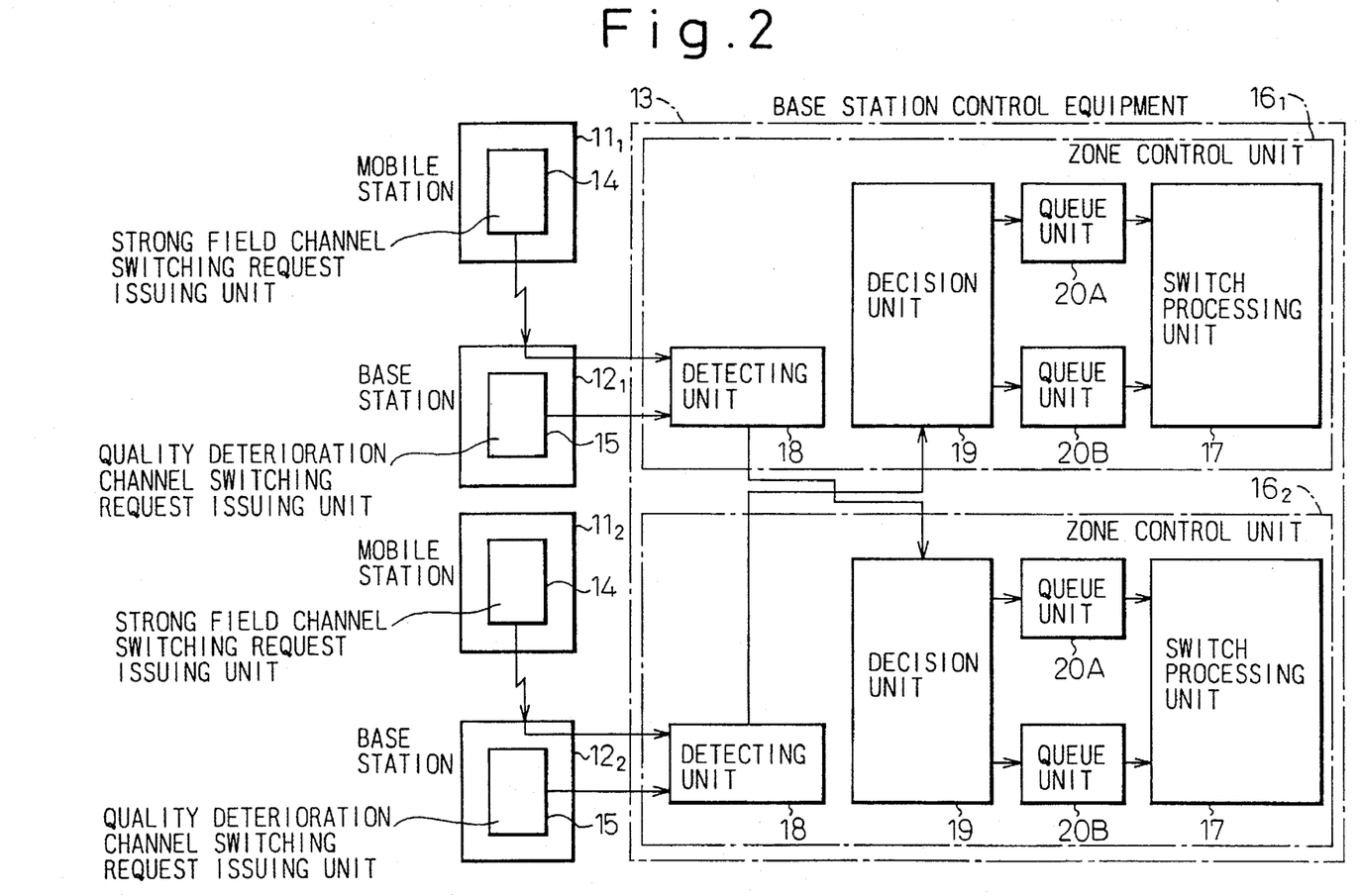
FIG. 2 is a view explaining a first embodiment of the present invention.

FIG. 2 is a view explaining the first embodiment of the present invention. It shows the configuration required for channel switching processing in the mobile telecommunication system. In the figure, $11_1$ and $11_2$ are mobile stations, $12_1$ and $12_2$ are base stations, 13 is a base station control equipment, 14 is a strong field channel switching request issuing unit, 15 is a quality deterioration channel switching request issuing unit, $16_1$ and $16_2$ are zone control units, 17 is a switch processing unit, 18 is a detecting unit, 19 is a decision unit, and 20A and 20B are a first and second queue unit.

The mobile stations $11_1$ and $11_2$ for example have the configurations shown in FIG. 9, but only the strong field channel switching request issuing units 14, which can be realized by the function of the control unit 86, are shown. Further, the base stations $12_1$ and $12_2$ for example have the configurations shown in FIG. 10, but only the quality deterioration channel switching request issuing units 15, which can be realized by the functions of the transmitting/receiving apparatus 94, the modulating-demodulating apparatus 95, and the base station monitoring apparatus 98, are shown. Further, generally, the base stations $12_1$ and $12_2$ and the base station control equipment 13 are connected through a transmission line 104, exchange 101, etc. as shown in FIG. 10, for example, but in FIG. 2, for simplification, illustration of these is omitted. A large number of base stations and zone control units corresponding to these base stations are provided.

The signal for a request for channel switching to a stronger field from the strong field channel switching request issuing unit 14 of a mobile station includes an identification code and mobile-station number and is sent by a speech channel etc. to the base station of the zone in which the mobile station is located. The request for channel switching due to deterioration of quality from the quality deterioration channel switching request issuing unit 15 of a base station includes an identification code and mobile-station number. When a base station receives a request for channel switching to a stronger field from a mobile station, it transfers it to the base station control equipment 13.

The detecting unit 18 in the zone control unit $16_1$ or $16_2$ of the base station control equipment 13 selects the optimal destination for channel switching when receiving a request for channel switching to a stronger field obtained from a mobile station through a base station and a request for channel switching due to deterioration of quality from a base station. It then transfers the same to the decision unit 19 of the zone control unit for the destination of the channel switching. The decision unit 19 decides if the request for channel switching is a request for channel switching to a stronger field or a request for channel switching due to deterioration of quality. When a request for channel switching to a stronger field, the mobile-station number is written in the second queue unit 20B. When a request for channel switching due to deterioration of quality, the mobile-station number is written in the first queue unit 20A. The first and second queue units 20A and 20B may be made by FIFO type memories.

The switch processing unit 17 decides if mobile-station numbers of stations standing by for channel switching processing are written in the first queue unit 20A. If written, the channel switching processing is executed in the order written. If not written, it decides if mobile-station numbers of stations standing by for channel switching processing are written in the second queue unit 20B. If written, the channel switching processing is executed in the order written. That is, the channel switching processing is performed with priority given to the mobile stations relating to requests for channel switching due to deterioration of quality. If there are no mobile stations relating to requests for channel switching due to deterioration of quality and only mobile stations issuing requests for channel switching to a stronger field, then the channel switching processing is executed for the mobile stations issuing the requests for channel switching to a stronger field. Notification of the assignment of channels resulting from the channel switching processing is sent from the exchange through a base station to the mobile station. The mobile station controls the synthesizer unit (see 85 in FIG. 9) in accordance with the assigned channel so as to switch channels.

For example, in FIG. 8, if there is just one idle channel in the zone B of the base station BS2, when the mobile station MS1 moves from the zone A to the zone B and sends a request for channel switching to a stronger field to the base station BS1 of the zone A, the base station BS1 transfers this to the base station control equipment BCE. The base station control equipment BCE decides that the destination of channel switching of the request for channel switching to a stronger field is the zone B and writes this in the second queue unit of the base station BS2.

Next, when the mobile station MS2 moves from the zone C toward the zone B and the base station BS3 of the zone C sends a request for channel switching due to deterioration of quality to the base station control equipment BCE, the base station control equipment BCE decides that the destination of the channel switching of the request for channel switching due to deterioration of quality is the zone B and writes this in the first queue unit of the base station BS2. As mentioned earlier, the first queue unit is processed on a priority basis, so the idle channel is assigned by the channel switching processing to the mobile station MS2 with the large chance of rapid deterioration of the quality of service. That is, the idle channel of the base station BS2 is assigned to the mobile station MS2.

Figure 3:
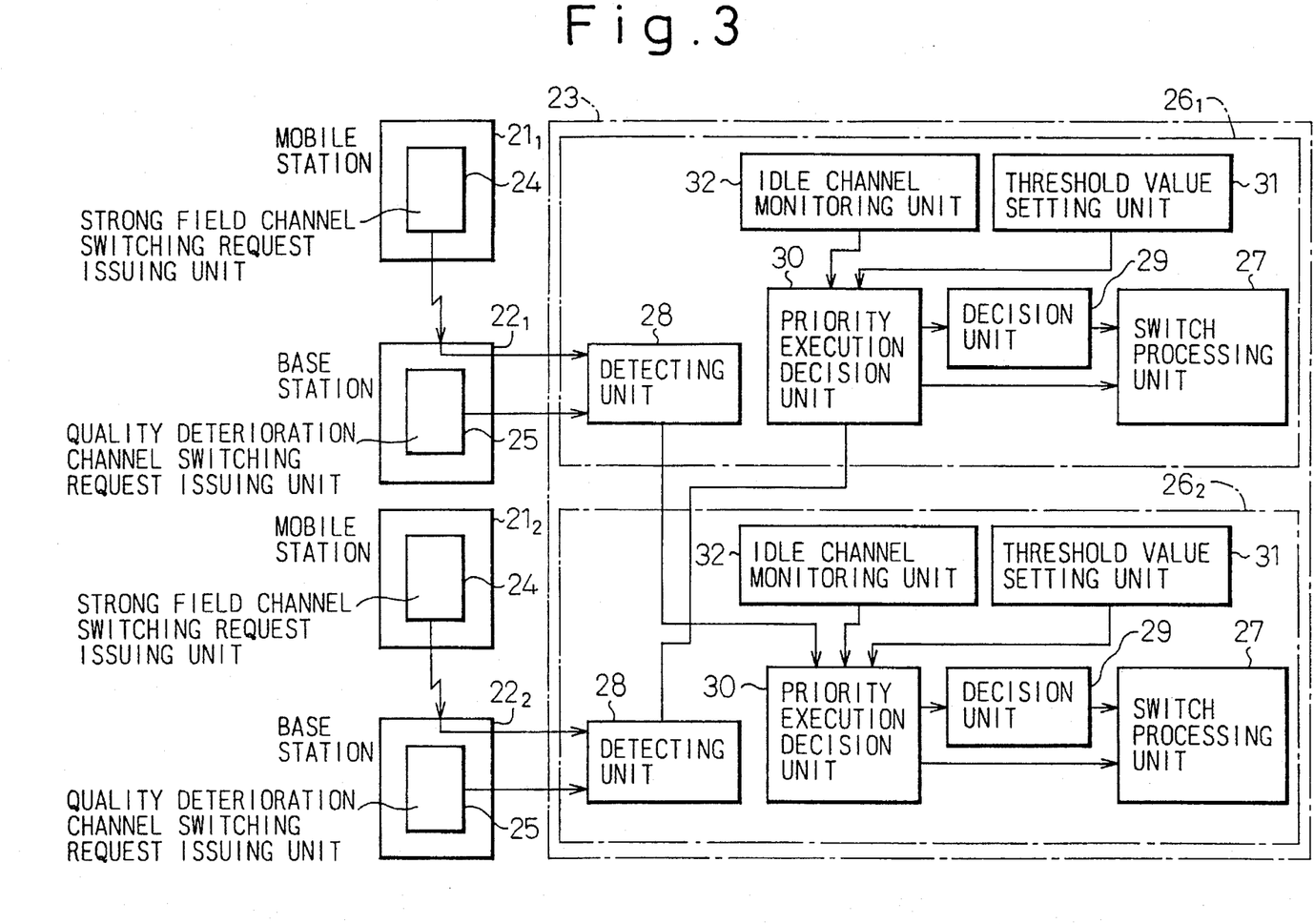
FIG. 3 is a view explaining a second embodiment of the present invention.

FIG. 3 is a view explaining the second embodiment of the present invention. It shows the key parts required for the channel switching control in the same way as in FIG. 2. In the figure, 21₁ and 21₂ are mobile stations, 22₁ and 22₂ are base stations, 23 is a base station control equipment, 24 is a strong field channel switching request issuing unit, 25 is a quality deterioration channel switching request issuing unit, 26₁ and 26₂ are zone control units, 27 is a switch processing unit, 28 is a detecting unit, 29 is a decision unit, 30 is a priority execution decision unit, 31 is a threshold value setting unit, and 32 is an idle channel monitoring unit.

This embodiment performs channel switching processing giving priority to the requests for channel switching due to deterioration of quality over the requests for channel switching to a stronger field when there are not enough idle channels. Accordingly, it monitors the number of idle channels in the engaged zone by the idle channel monitoring unit 32, sets the threshold value for deciding on priority execution in the threshold value setting unit 31, and decides if the number of idle channels of the engaged zone is less than the threshold value for deciding on priority execution at the priority execution decision unit 30. For example, if the number of channels is 12, the threshold value is made 2.

As explained above, if a request for channel switching to a stronger field from a mobile station is transferred to the base station control equipment 23 through a base station and a request for channel switching due to deterioration of quality from a base station is transferred to the base station control equipment 23, the detecting unit 28 detects the destinations of the channel switching and transfers the same to the priority execution decision unit 30 of the zone control unit 26 of the channel switching destinations.

The priority execution decision unit 30 does not perform priority processing when the number of idle channels is over the threshold value for deciding on priority execution since there are a large number of idle channels, but transfers the requests for channel switching transferred through the other zone control unit 26 to the switch processing unit 27 to execute channel switching processing. If the number of idle channels is less than the threshold value for deciding on priority execution, it performs priority processing since there are only a few idle channels. That is, the decision unit 29 decides if a request is a request for channel switching to a stronger field or a request for channel switching due to deterioration of quality, gives priority to a request for channel switching due to deterioration of quality and notifies this to the switch processing unit 27, which executes the channel switching processing.

For example, if the number of speech channels in the zone B of FIG. 8 is 6 and the threshold value for deciding on priority execution set at the threshold value setting unit is 2, if the number of channels in use is 3, then there are 3 idle channels (6–3). Since the number of idle channels (3) is greater than the threshold value (2) for deciding on priority execution, when the destination of the channel switching of a request for channel switching to a stronger field from the mobile station MS1 is the zone B, channel switching processing is performed.

Next, when the mobile station MS2 in the zone C moves toward the zone B and the base station BS3 of the zone C detects a reduction of the received level from the mobile station MS2 and sends a request for channel switching due to deterioration of quality to the base station control equipment BCE, the priority execution decision unit 30 of the zone B in the base station control equipment (BCE) (see FIG. 3) decides that the number of the idle channels is less than the threshold value since the number of idle channels is 2 according to the idle channel monitoring unit 32 and the threshold value for deciding on priority execution set in the threshold value setting unit 31 is 2 and therefore notifies the decision unit 29 of this. The decision unit 29 then decides if the request for channel switching is a request for channel switching to a stronger field or a request for channel switching due to deterioration of quality. Since the request for channel switching from the base station BS3 was a request for channel switching due to deterioration of quality, it notifies this to the switch processing unit 27. The switch processing unit 27 then performs processing to assign the idle channel to the mobile station MS2.

Next, if the mobile station MS3 in the zone A moves toward the zone B, it sends a request for channel switching to a stronger field to the base station BS1. If the detecting unit 28 of the zone A detects that the destination of channel switching is the zone B, it transfers the request for channel switching to a stronger field to the priority execution decision unit 30 of the zone B, then the priority execution decision unit 30 of the zone B notifies the decision unit 29 that a decision on priority should be made since it has one idle channel and the threshold value for deciding on priority execution is 2. If the decision unit 29 decides that the request for channel switching is a request for channel switching to a stronger field, it rejects the channel switching processing. Accordingly, the mobile station MS3 continues communication via the channel assigned at the zone A.

Since the received level of the base station BS1 becomes lower the further the mobile station MS3 is from the base station BS1, a request for channel switching due to deterioration of quality is sent from the base station BS1 to the base station control equipment BCE. This decides that the destination of channel switching is the zone B. The priority execution decision unit 30 of the zone B decides on the priority since the number of idle channels falls below a threshold value for deciding on priority execution and notifies this decision to the decision unit 29. The decision unit 29 decides that the request is a request for channel switching due to deterioration of quality and notifies this to the switch processing unit 27. Due to this, the switch processing unit 27 assigns an idle channel to the mobile station MS3.

Figure 4:
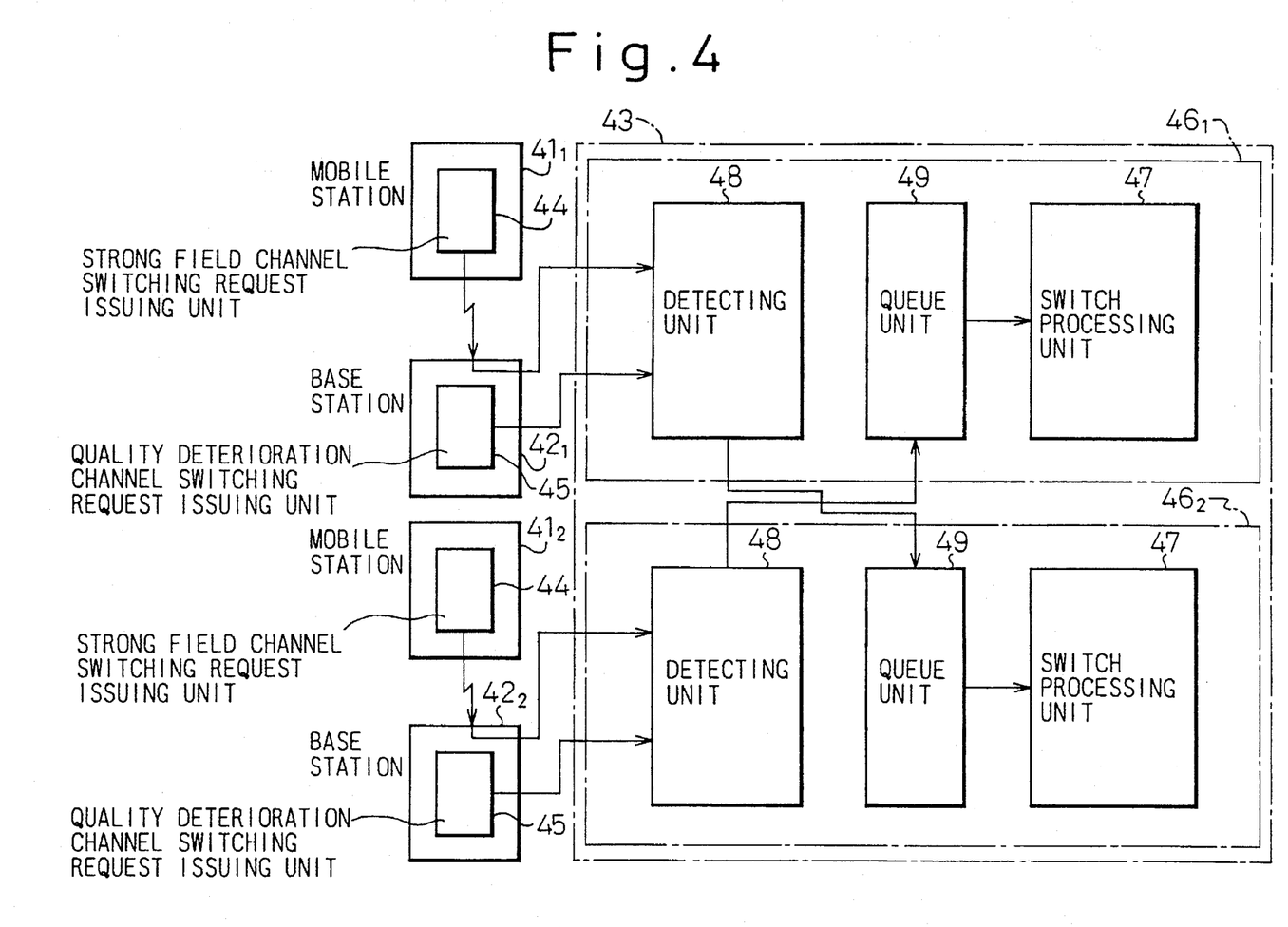
FIG. 4 is a view explaining a third embodiment of the present invention.

FIG. 4 is a view explaining the third embodiment of the present invention. It shows the key parts required for the channel switching control in the same way as in FIG. 2. In the figure, $41_1$ and $41_2$ are mobile stations, $42_1$ and $42_2$ are base stations, 43 is a base station control equipment, 44 is a strong field channel switching request issuing unit, 45 is a quality deterioration channel switching request issuing unit, $46_1$ and $46_2$ are zone control units, 47 is a switch processing unit, 48 is a detecting unit, and 49 is a queue unit.

The detecting unit 48 of the zone control unit receives requests for channel switching to a stronger field from the mobile stations $41_1$ and $41_2$ through the base stations $42_1$ and $42_2$ and requests for channel switching due to deterioration of quality from the base stations $42_1$ and $42_2$, detects the destinations of the channel switching, transfers the requests for channel switching to the queue units 49 in the zone control units 46 of the destinations of channel switching, and writes the mobile-station numbers and received levels in the queue units.

The switch processing unit 47 searches for the mobile station with the lowest received level among the mobile stations standing by for channel switching processing whose IDs are written in the queue unit 49 and executes the channel switching processing for that mobile station. When the processing ends, it searches for the mobile station with the next lowest received level and executes channel switching processing for that mobile station. Accordingly, it is possible to perform channel switching processing giving priority to the mobile stations with no margin of time in terms of deterioration of the quality of service.

For example, in FIG. 8, when there is only one idle channel in the zone B, if the mobile stations MS1, MS2, and MS3 successively send requests for channel switching and it is decided that the destinations for channel switching are the zone B, then the mobile-station numbers and received levels of the mobile stations MS1, MS2, and MS3 are successively written in the queue unit 49 of the zone B. For example, if the received levels from the mobile stations MS1, MS2, and MS3 are 10 dBμ, 4 dBμ, and 20 dBμ, respectively, the switch processing unit 47 assigns the last remaining idle channel to the mobile station MS2 exhibiting the lowest received level of 4 dBμ.

Figure 5:
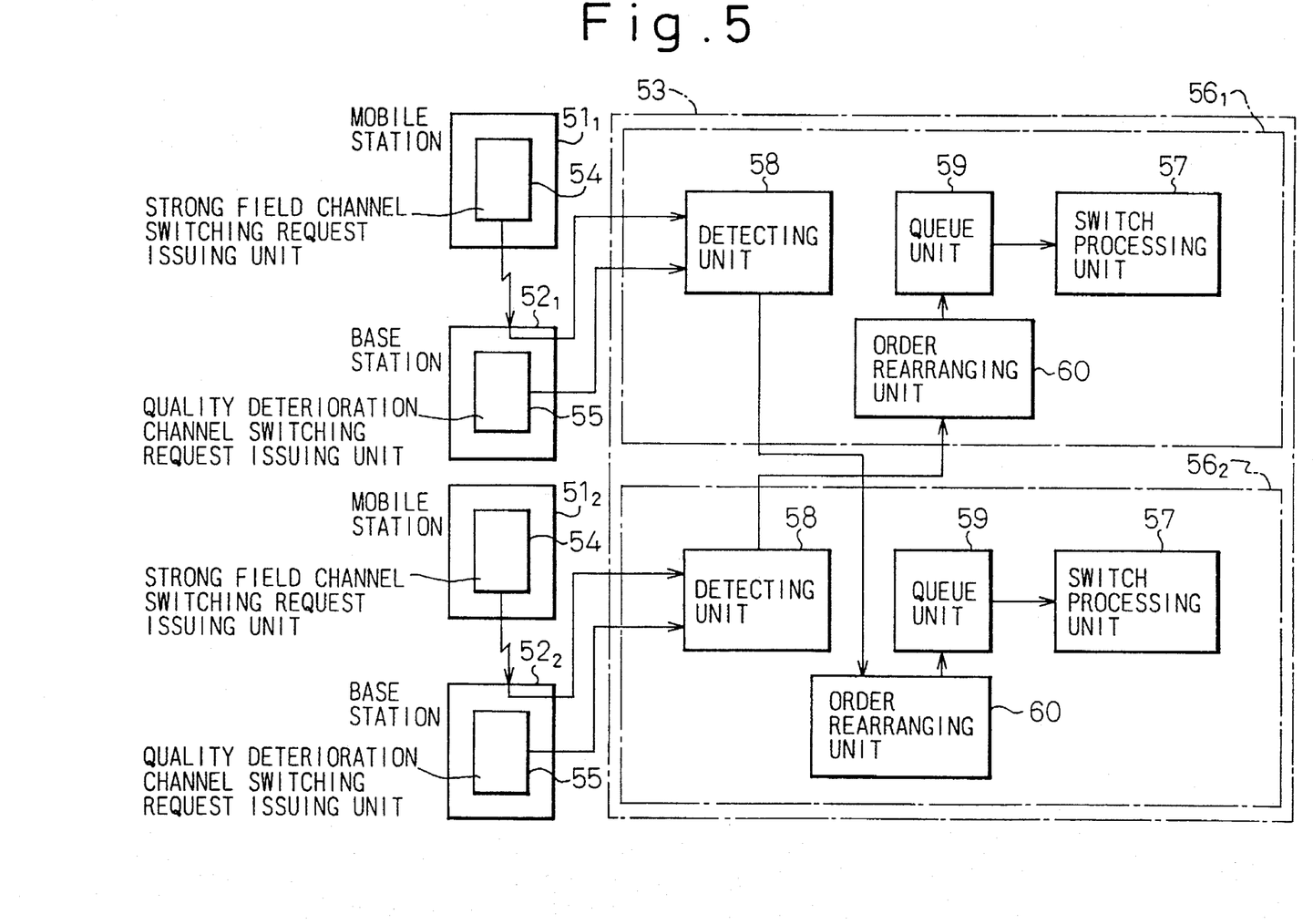
FIG. 5 is a view explaining a fourth embodiment of the present invention.

FIG. 5 is a view explaining the fourth embodiment of the present invention. It shows the key parts required for the channel switching control in the same way as in FIG. 2. In the figure, $51_1$ and $51_2$ are mobile stations, $52_1$ and $52_2$ are base stations, 53 is a base station control equipment, 54 is a strong field channel switching request issuing unit, 55 is a quality deterioration channel switching request issuing unit, $56_1$ and $56_2$ are zone control units, 57 is a switch processing unit, 58 is a detecting unit, 59 is a queue unit, and 60 is a order rearranging unit.

The embodiment shown in FIG. 4 searches through the queue unit in the switch processing unit (47) to perform priority processing of channel switching. This embodiment, however, rearranges the order of standby for channel switching processing in the queue unit 59 by the order rearranging unit 60. That is, when a request for channel switching having the engaged zone as the destination for channel switching is transferred from a detecting unit 58 of another zone, the order rearranging unit 60 rewrites the mobile-station numbers and received levels written in the queue unit 59 in order from the lowest received level down.

Accordingly, the switch processing unit 57 executes the channel switching processing on the mobile station corresponding to the ID at the top of the queue unit 59. Due to this, it is possible to execute channel switching processing giving priority to the mobile station with little margin of time for maintaining a predetermined quality of service among the mobile stations standing by for channel switching processing.

Figure 6:
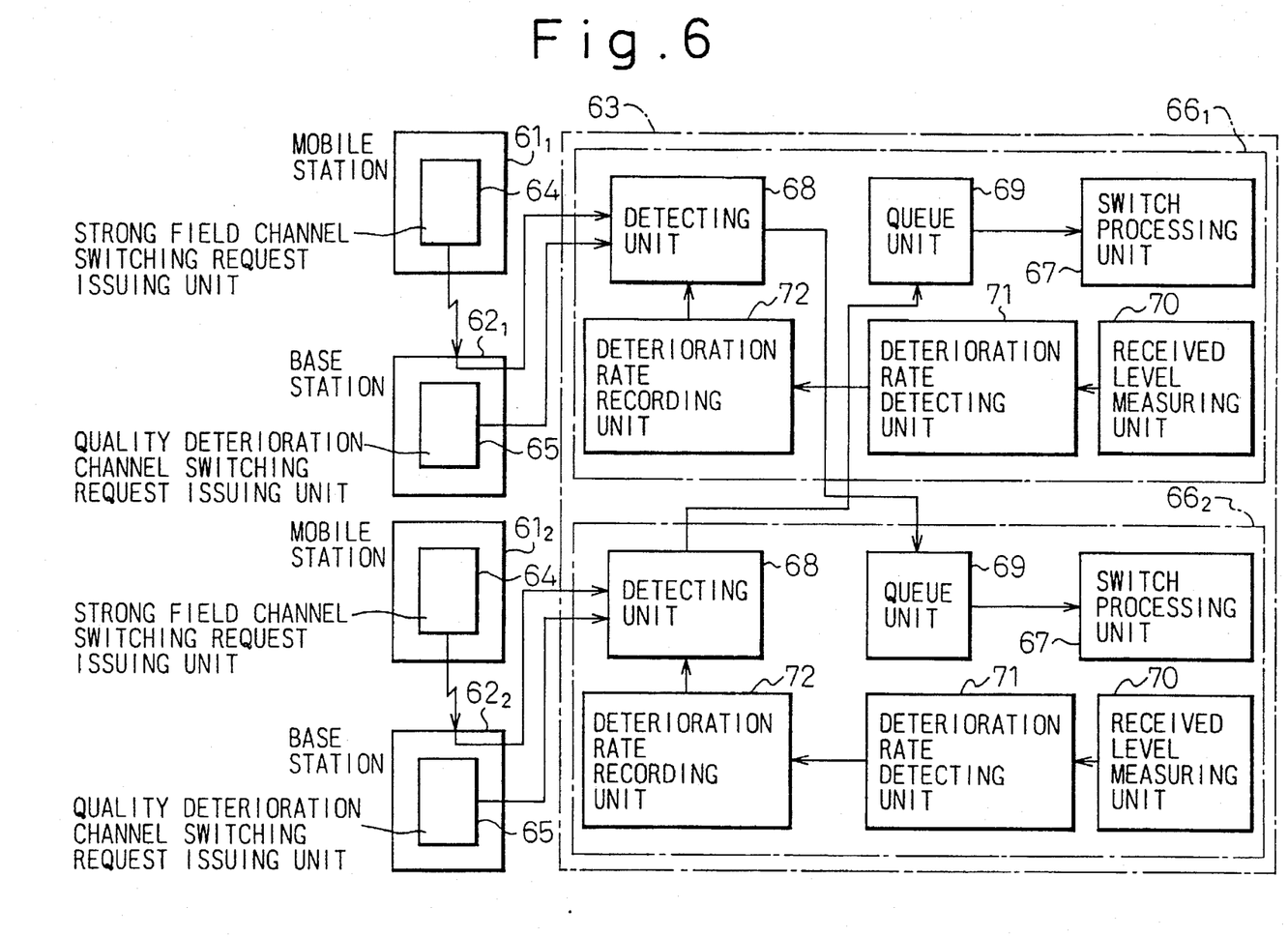
FIG. 6 is a view explaining a fifth embodiment of the present invention.

FIG. 6 is a view explaining the fifth embodiment of the present invention. It shows the key parts required for the channel switching control in the same way as in FIG. 2. In the figure, $61_1$ and $61_2$ are mobile stations, $62_1$ and $62_2$ are base stations, 63 is a base station control equipment, 64 is a strong field channel switching request issuing unit, 65 is a quality deterioration channel switching request issuing unit, $66_1$ and $66_2$ are zone control units, 67 is a switch processing unit, 68 is a detecting unit, 69 is a queue unit, 70 is a received level measuring unit, 71 is a deterioration rate detecting unit, and 72 is a deterioration rate recording unit.

This embodiment is one in which the rate of deterioration of the received level for each mobile station is found and recorded and priority is given to the mobile station with the greatest rate of deterioration in execution of processing for channel switching. Therefore, the received level measuring unit 70 measures the received levels of the mobile stations in its engaged zone, and the deterioration rate detecting unit 71 detects the rates of deterioration of the received levels from the changes in the received levels of the mobile station and records the results of detection in the deterioration rate recording unit 72 in correspondence with the mobile stations. In this case, it is also possible to simultaneously record the received levels measured at the received level measuring unit 70.

Further, if a request for channel switching to a stronger field from a mobile station obtained through a base station or a request for channel switching due to deterioration of quality from a base station is transferred to the detecting unit 68 of the zone control unit 66, the destination of the channel switching is detected and the rate of deterioration of the mobile station relating to the request for channel switching is read out from the deterioration rate recording unit 72 and the mobile-station number and rate of deterioration are written in the queue unit 69 of the destination of channel switching. Further, in the case, the mobile-station number, the rate of deterioration, and the received level can be transferred and written in the queue unit 69.

The switch processing unit 67 searches through the queue unit 69, reads out the mobile-station number with the greatest rate of deterioration, and executes channel switching processing on that mobile station. That is, the mobile station which moves at a high speed in a direction away from its present zone will have a high rate of deterioration of the received level and according will have little margin of time until the quality of service falls below a predetermined level, so is given priority to in processing for channel switching. Further, when writing in the queue unit 69 the mobile-station numbers, rates of deterioration, and received levels of the mobile stations standing by for channel switching processing, the switch processing unit 67 gives priority in channel switching processing to the mobile station with the lower received level among two or more mobile stations with the same rates of deterioration.

For example, in FIG. 8, if the trigger for detection of the level deterioration rate is made a received level of 15 dBµ and the detection period of the level deterioration rate is made 3 seconds, then when the received level when a mobile station MS1 moves from a point a1 to a point a2 is 15 dBµ, the deterioration rate detecting unit 71 of the zone A will start detecting the rate of deterioration and write the mobile-station number and received level 15 dBµ of the mobile station MS1 in the deterioration rate recording unit 72. If the received level at the point s3 after the elapse of 3 seconds is 12 dBµ, the deterioration rate detecting unit 71 writes the difference between the previous 15 dBµ and the current 12 dBµ, that is, 3 dBµ, as the rate of deterioration in the deterioration rate recording unit 72.

Similarly, when the received levels of the mobile stations MS2 and MS3 at the points b1, b2, b3, c1, c2, and c3 fall below 15 dBµ, detection of the rates of deterioration is started. Further, the difference in received levels between the past and present is written as the rate of deterioration in the deterioration rate recording unit 72 every 3 seconds. Note that it is also possible to apply another method of calculating the rate of deterioration. For example, it is possible to make the unit time 1 second and to find the rate of deterioration for each second. Further, it is possible to write the received level together with the rate of deterioration in the deterioration rate recording unit 72.

Further, the rate of deterioration is transferred or the rate of deterioration and the received level are transferred to the destination of the channel switching according to the request for channel switching and then written in the queue unit 69. If there are large number of the mobile stations standing by for channel switching, the channel switching processing is executed giving priority to the mobile station with the largest rate of deterioration. If two or more mobile stations exhibit the same rates of deterioration, the mobile station with the lower received level is given priority in channel switching processing. Due to this, the possibility of ensuring a predetermined quality of service can be increased.

Figure 7A:
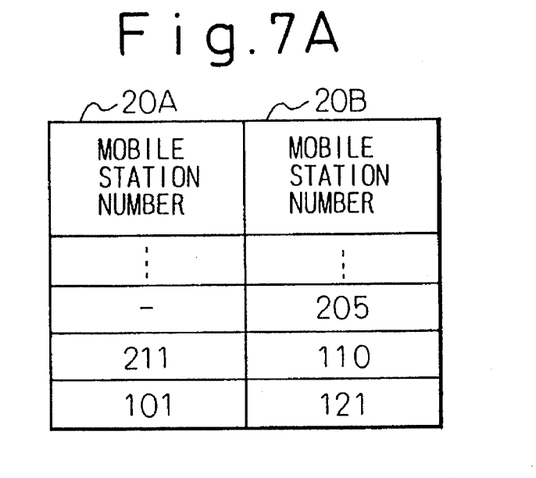
FIGS. 7A to 7E are views explaining queue units and a deterioration rate recording unit in an embodiment of the present invention.

FIGS. 7A to 7E are views explaining the queue units and deterioration rate recording unit in an embodiment of the present invention. FIG. 7A shows an example of the first and second queue units 20A and 20B in the embodiment shown in FIG. 2. It shows the state where mobile-station numbers 101 and 211 of the mobile stations relating to requests for channel switching due to deterioration of quality are written in the first queue unit 20A and the mobile-station numbers 121, 110, and 205 of the mobile stations issuing requests for channel switching due to deterioration of quality are written in the second queue unit 20B as a result of the decision by the decision unit 19.

Regarding the first and second queue units 20A and 20B, the switch processing unit 17 (FIG. 2) first performs channel switching processing for the mobile-station number 101 written in the first queue unit 20A and then performs channel switching processing for the mobile-station number 211. Next, if there is no mobile-station number standing by for channel switching processing written in the first queue unit 20A, it performs channel switching processing for the mobile-station number 121 written in the second queue unit 20B, then executes channel switching processing for the mobile-station number 110, then executes channel switching processing for the mobile-station number 205.

Accordingly, in the case where there is just one idle channel, if a request for channel switching to a stronger field and a request for channel switching due to deterioration of quality are transferred to the base station control equipment 13 around the same time, priority is given to the request for channel switching due to deterioration of quality in processing and the mobile station issuing the request for channel switching to a stronger field, which has somewhat of a margin of time until the quality of service falls below a predetermined level, stands by until another channel becomes idle. When another channel becomes idle, the channel switching processing is executed in the order of mobile-station numbers written in the second queue unit 20B unless a mobile-station number awaiting channel switching processing is written in the first queue unit 20A.

Figure 7B:
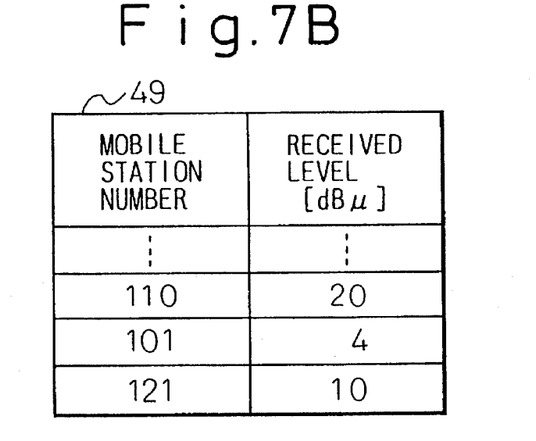

Further, FIG. 7B shows an example of the queue unit 49 in the embodiment shown in FIG. 4. It shows the state where the mobile-station numbers 121, 101, and 110 and received levels (dBµ) shown by 10, 4, and 20 are written. The switch processing unit 47 searches through the queue unit 49 and executes processing for channel switching for the mobile-station number 101 with the lowest received level. Next, it executes processing for channel switching for the mobile-station number 121 exhibiting a received level of 10 dBµ.

Figure 7C:
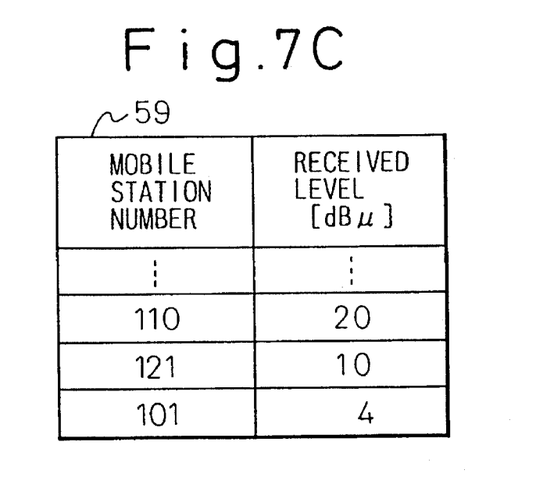

Further, FIG. 7C shows an example of the queue unit 59 in the embodiment shown in FIG. 5. It shows the state of rearrangement of the content of the queue unit 49 of FIG. 7B by the order rearranging unit 60. That is, the content is rearranged in the order of the lowest received level down. Accordingly, if there is a request for channel switching from a mobile station with the lowest received level for a mobile station awaiting channel switching processing, the mobile-station number of the mobile station with the lowest level is arranged at the top of the queue unit 59 and therefore processing for channel switching is executed for that mobile station first by the switch processing unit 57.

Figure 7D:
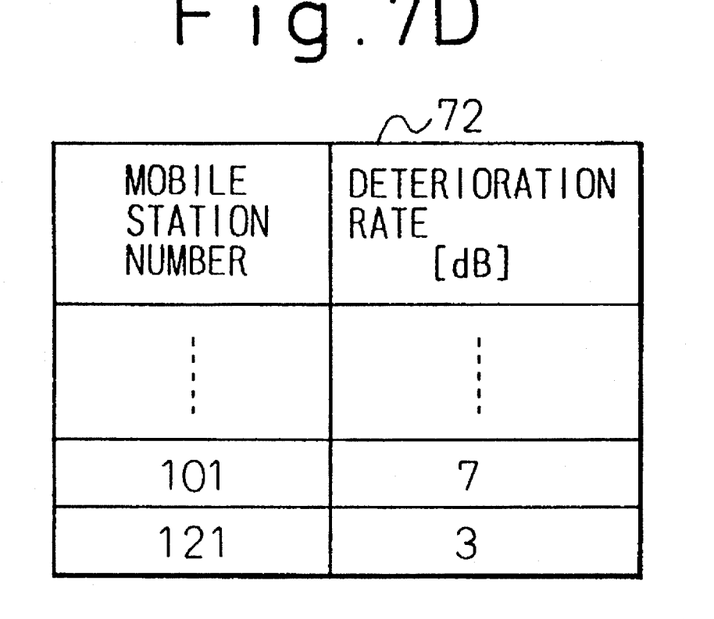
Figure 7E:
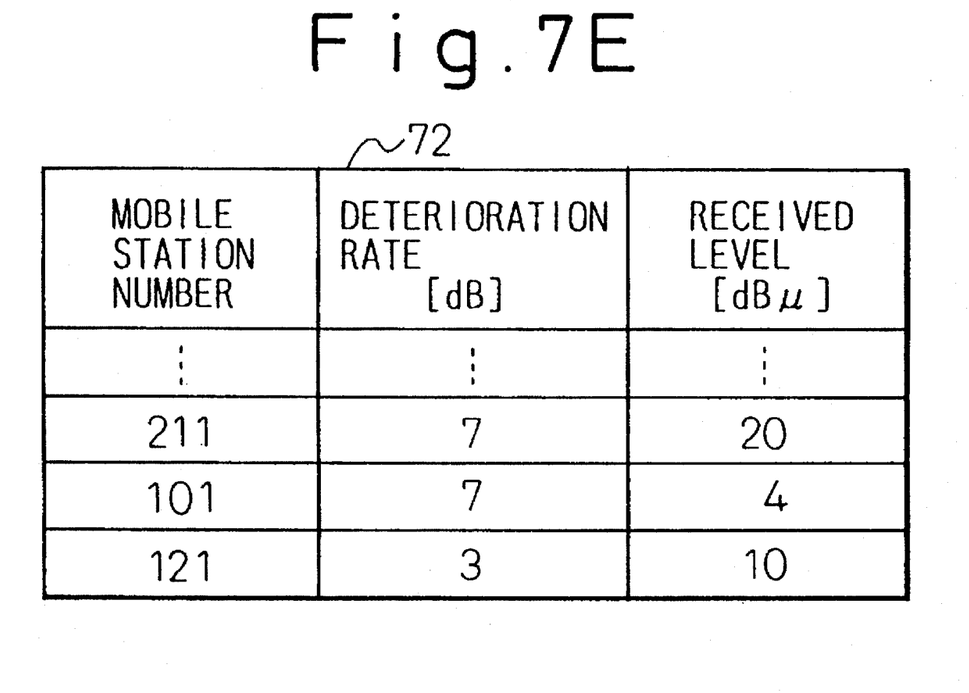

FIGS. 7D and 7E show examples of the deterioration rate recording unit 72 in the embodiment shown in FIG. 6. FIG. 7D shows the case of recording the mobile-station numbers 121 and 101 and the rates of deterioration 3 and 7, while FIG. 7E shows the case of recording the mobile-station numbers 121, 101, and 211, the rates of deterioration 3, 7, and 7, and the received levels 10, 4, and 20. The rates of deterioration in these cases show the differences between the previous received levels and the current received levels in a period of detection of the rates of detection.

The detecting unit 68 in FIG. 6 detects the destination of the channel switching and transfers to the queue unit 69 of the destination of channel switching the rate of deterioration read out from the deterioration rate recording unit 72 or the rate of deterioration and the received level, together with the mobile-station number. The switch processing unit 67 performs the channel switching processing for the mobile-station number with the greatest rate of deterioration. When the content of the queue unit 69 becomes the content of FIG. 7E, the rates of deterioration for the mobile-station numbers 101 and 211 are both 7, or equal, but the received level of the mobile-station number 101 is lower, so priority is given to the mobile-station number 101 in the channel switching processing.

While the invention has been described by reference to the specific embodiments chosen for purposes of illustration, it should be apparent that numerous modifications could be made thereto by those skilled in the art without departing from the basic concept and scope of the invention.

For example, the functions of the different portions in the base station control equipment can be realized by the processing functions of a processor etc. Also, the base stations and the base station control equipment may be connected through optical transmission lines.

As explained above, the present invention performs priority processing on a request for channel switching due to deterioration of quality, in which there is no margin of time until the quality of service deteriorates below a predetermined level, over a request for channel switching to a stronger field, so even when there are only a few idle channels, channel switching processing is performed in a manner enabling the predetermined quality of service to be ensured.

Further, by writing the request for channel switching due to deterioration of quality in the first queue unit, writing the request for channel switching to a stronger field in the second queue unit, and giving priority to the first queue unit in processing, the priority processing for the mobile station with little margin of time until the quality of service deteriorates below a predetermined level becomes simpler.

Also, by giving priority to the request for channel switching due to deterioration of quality in processing when the number of idle channels falls below a threshold value for deciding on priority execution, efficient priority processing becomes possible even when there are a large number of channels in a zone and a large number of mobile stations there.

In addition, due to the fact that the lower the received level, the less of a margin of time there is until the quality of service falls below a predetermined level, by comparing the received levels of the mobile stations relating to requests for channel switching and executing the processing for channel switching giving a higher priority the lower the received level, it becomes possible to ensure a predetermined quality of service.

Also, due to the fact that the higher the rate of deterioration of a received level, the less of a margin of time there is until the quality of service falls below a predetermined level, it is possible to give priority to processing for channel switching based on the rate of deterioration or give priority considering the received level as well. Due to this, priority control of processing for channel switching becomes possible based on the overall state, including the speed of movement etc., of the mobile stations.

I claim:

1. A channel switching control system for a mobile telecommunication system provided with base stations of zones for engaging in radio communication with mobile stations and base station control equipment for controlling the base stations, wherein the base station control equipment performs priority processing for a request channel switching due to deterioration of quality among a request for channel switching to a stronger field from a mobile station, caused when it is detected that there is another zone in which the received level would be higher than the received level of the zone of the base station which the mobile station is engaged in communication with, and a request for channel switching due to deterioration of quality from a base station, caused when the quality of service between the base station and the mobile station falls below a predetermined value.

2. A channel switching control system as set forth in claim 1, wherein the base station control equipment is provided with a first queue unit for writing IDs of mobile stations relating to requests for channel switching due to deterioration of quality, a second queue unit for writing IDs of mobile stations issuing requests for channel switching to a stronger field, and a channel switching processing unit and the channel switching processing unit performs channel switching processing on the mobile stations having IDs written in the second queue unit when the first queue unit is empty.

3. A channel switching control system as set forth in claim 1, wherein the base station control equipment is provided with a threshold value setting unit for setting a threshold value for deciding on priority execution, an idle channel monitoring unit, and a channel switching processing unit and the channel switching processing unit does not perform channel switching processing for mobile stations issuing requests for channel switching to a stronger field, but performs channel switching processing for mobile stations relating to requests for channel switching due to deterioration of quality when, according to the idle channel monitoring unit, the number of idle channels falls under the threshold value for deciding on priority execution set in the threshold value setting unit.

4. A channel switching control system as set forth in claim 1, wherein the base station control equipment is provided with a queue unit and a channel switching processing unit; in the queue unit, there are written mobile-station numbers and received levels of the mobile stations relating to requests for channel switching; and the channel switching processing unit selects the mobile station with the lowest received level in the queue unit and performs channel switching processing on that mobile station.

5. A channel switching control system as set forth in claim 1, wherein the base station control equipment is provided with a queue unit, an order rearranging unit, and a channel switching processing unit; the order rearranging unit compares the received levels of the mobile stations already written in the queue unit and the received level of a mobile station relating to a request for channel switching and rearranges the order in the queue unit in the order of the lowest received level down; and the channel switching processing unit performs channel switching processing on the mobile station with the lowest received level at the top of the queue unit.

6. A channel switching control system as set forth in claim 1, wherein the base station control equipment is provided with a deterioration rate recording unit for recording the rates of deterioration of the received levels and a channel switching processing unit; the deterioration rate recording unit records in it the rate of deterioration of the received level for each mobile station; and the channel switching processing is performed on the mobile stations making requests for channel switching starting from the mobile station with the largest rate of deterioration.

7. A base station control equipment for controlling base stations of zones for engaging in radio communication with mobile stations, wherein the base station control equipment is provided with a first queue unit for writing IDs of mobile stations relating to requests for channel switching due to deterioration of quality, a second queue unit for writing IDs of mobile stations issuing requests for channel switching to a stronger field, and a channel switching processing unit for performing channel switching processing on the mobile stations having IDs written in the second queue unit when the first queue unit is empty.

8. A base station control equipment for controlling base stations of zones for engaging in radio communication with mobile stations, wherein the base station control equipment is provided with a threshold value setting unit for setting a threshold value for deciding on priority execution, an idle channel monitoring unit, and a channel switching processing unit which does not perform channel switching processing for mobile stations issuing requests for channel switching to a stronger field, but performs channel switching processing for mobile stations relating to requests for channel switching due to deterioration of quality when, according to said idle channel monitoring unit, the number of idle channels falls under the threshold value for deciding on priority execution set in the threshold value setting unit.

9. A base station control equipment for controlling base stations of zones for engaging in radio communication with mobile stations, wherein the base station control equipment is provided with a queue unit which is written in it mobile-station numbers and received levels of the mobile stations relating to requests for channel switching, and a channel switching processing unit which selects the mobile station with the lowest received level in said queue unit and performs channel switching processing on that mobile station.

10. A base station control equipment for controlling base stations of zones for engaging in radio communication with mobile stations, wherein the base station control equipment is provided with a queue unit which is written in it received levels of said mobile stations and compares the received levels of the mobile stations already written in said queue unit with the received level of a mobile station relating to a request for channel switching and rearranges the order in said queue unit in the order of the lowest received level down, and a channel switching processing unit which performs channel switching processing on the mobile station with the lowest received level at the top of said queue unit.

11. A base station control equipment for controlling base stations of zones for engaging in radio communication with mobile stations, wherein the base station control equipment is provided with a deterioration rate recording unit for recording in it the rates of deterioration of the received levels for each mobile station, and a channel switching processing unit which performs the channel switching processing on the mobile stations making requests for channel switching starting from the mobile station with the largest rate of deterioration recorded in said deterioration rate recording unit.

* * * * *